(12) United States Patent
Watanabe et al.

(10) Patent No.: US 10,976,727 B2
(45) Date of Patent: Apr. 13, 2021

(54) TEACHING METHOD FOR SYSTEM FOR TAKING OUT MOLDED PRODUCT AND APPARATUS FOR TAKING OUT MOLDED PRODUCT

(71) Applicant: Yushin Precision Equipment Co., Ltd., Kyoto (JP)

(72) Inventors: Fumitake Watanabe, Kyoto (JP); Atsushi Shirasaki, Kyoto (JP); Kazutaka Ando, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 0 days.

(21) Appl. No.: 17/016,810

(22) Filed: Sep. 10, 2020

(65) Prior Publication Data

US 2021/0080933 A1    Mar. 18, 2021

(30) Foreign Application Priority Data

Sep. 12, 2019    (JP) .............................. JP2019-165791

(51) Int. Cl.
| | |
|---|---|
| *H04N 7/18* | (2006.01) |
| *G05B 19/4155* | (2006.01) |
| *H04N 5/225* | (2006.01) |
| *H04N 5/445* | (2011.01) |

(52) U.S. Cl.
CPC ....... *G05B 19/4155* (2013.01); *H04N 5/2253* (2013.01); *H04N 5/445* (2013.01); *G05B 2219/45244* (2013.01)

(58) Field of Classification Search
CPC ...... G05B 19/4155; G05B 2219/45244; H04N 7/18; H04N 5/2253; H04N 5/445

USPC .......................................................... 348/95
See application file for complete search history.

(56) References Cited

U.S. PATENT DOCUMENTS

| | | | |
|---|---|---|---|
| 7,018,194 B2 * | 3/2006 | Kitamura ............ | B30B 15/0017 425/193 |
| 8,419,400 B2 * | 4/2013 | Itoh ..................... | C04B 35/4682 425/78 |
| 10,247,549 B2 * | 4/2019 | Lee ...................... | G01B 11/272 |
| 10,518,347 B2 * | 12/2019 | Jin ....................... | B23K 1/0056 |
| 2020/0033552 A1 * | 1/2020 | Wu ....................... | G02B 7/08 |

FOREIGN PATENT DOCUMENTS

JP         2018-114752 A         7/2018

* cited by examiner

*Primary Examiner* — Trang U Tran
(74) *Attorney, Agent, or Firm* — Rankin, Hill & Clark LLP

(57) ABSTRACT

An image display device displays an image such that a pair of reference symmetric structure portions, e.g. a pair of guide pins, are included in a captured image displayed on a display section, the pair of reference symmetric structure portions being located symmetrically with respect to a second virtual plane which extends in the opening direction and the vertical direction and includes a virtual center line of the molding apparatus which extends in the opening direction. A teaching execution section is used to determine the lateral position of an approach frame in the take-out operation by changing the position of the approach frame such that the center of an imaging range is located at a middle position between the pair of reference symmetric structure portions included in the captured image.

11 Claims, 7 Drawing Sheets

TEACHING METHOD FOR SYSTEM FOR TAKING OUT MOLDED PRODUCT AND APPARATUS FOR TAKING OUT MOLDED PRODUCT

TECHNICAL FIELD

The present invention relates to a teaching method for a system for taking out molded product, the system teaching operation or operating sequence of an apparatus for taking out molded product that takes out a molded product from an injection molding apparatus while operating the apparatus for taking out molded product, and relates to the apparatus for taking out molded product.

BACKGROUND ART

An apparatus for taking out molded product repeatedly performs operation to receive a molded product at a product take-out position in a die of a molding apparatus using a take-out head, and release the molded product at a product release position outside the molding apparatus. The operation or operating sequence of an apparatus for taking our molded product is taught by using a so-called teaching program. To suction a product, it is normally necessary to perform teaching so as to bring a take-out head, which is mounted to the distal end of an approach frame of the apparatus for taking out molded product, closer to the die by positioning the take-out head in three directions, that is, a lateral direction (a direction that is orthogonal to the direction in which the die is opened and closed and the up-down direction), a pull-out direction (the direction in which the die is opened and closed), and the up-down direction. Finally, it is necessary to make an adjustment such that there is no deviation from a suctioned surface by pressing the head so as to align a suctioning portion or a grasping portion (in general, the center of the head) of the head with an appropriate position (e.g. the center of the molded product) of the molded product. When aligning the center of the take-out head with the center of the molded product, an adjustment can be made for the pull-out direction and the up-down direction through visual observation from an operation position on a side surface with respect to the longitudinal direction of the molding apparatus. For the lateral direction, however, an adjustment cannot be easily made through visual observation because of the "depth", and the die and the head occasionally contact each other. Thus, in the conventional art, the adjustment depends on the skills of an operator, who often climbs on top of the molding apparatus and makes an alignment in the lateral direction while viewing downward. However, such a teaching method involves the risk of a fall, and may unnecessarily extend the operation time as well. The conventional teaching method also depends on the skills of the operator.

Japanese Unexamined Patent Application Publication No. 2018-114752 (JP 2018-114752 A) describes a teaching method for a system for taking out molded product, the system including a plurality of imaging devices configured to capture images around a fixed frame and images around moving frames and an image display device configured to display an integrated captured image obtained by integrating the images (including both moving images and still images) captured by the plurality of imaging devices, the teaching method including an operator performing teaching of an operating sequence while viewing the integrated captured image displayed on the image display device.

SUMMARY OF INVENTION

Technical Problem

In the technique described in Patent Document 1, however, a plurality of imaging devices are required, and the positional relationship between an attachment mounting portion of an approach frame and a die in the lateral direction must be specified while viewing an integrated captured image, which makes the teaching operation difficult.

It is an object of the present invention to provide a teaching method for a system for taking out molded product and an apparatus for taking out molded product, the teaching method and the apparatus allowing performing teaching in the lateral direction using a single imaging device, by devising the installation position of the imaging device and utilizing the characteristics of the inherent structure of a molding apparatus and the inherent structure of a die.

Solution to Problem

The present invention performs teaching for a system for taking out molded product, the system including: a fixed frame; a movable frame that is movable along the fixed frame; an approach frame including an attachment such as a take-out head and movably held on the movable frame to go into a die of a molding apparatus; an operation control section configured to move the movable frame and the approach frame according to an operating sequence set in advance to take out the molded product from the die of the molding apparatus with the die being opened, and to carry the molded product to a predetermined position and release the molded product; an imaging device disposed to capture an image of and around the die; and an image display device configured to display the captured image, which is captured by the imaging device, on a display section. The operation control section including a teaching execution section configured to enable an operator to execute teaching of the operating sequence by changing a position of the approach frame while viewing the captured image displayed on the image display device.

The teaching method for a system for taking out molded product according to the present invention includes disposing the imaging device so as to be able to capture the image of and around the die from a location above or obliquely above the die, and such that a center of an imaging range is located in a first virtual plane, which extends in both an opening direction in which the die is opened and closed and a vertical direction and which includes a center of an attachment mounting portion of the approach frame, when a take-out operation is started. The phrase "when a take-out operation is started" refers to the time when the approach frame which is located above the die starts being lowered. The imaging device can be attached to a movable base operable to move the approach frame, the approach frame, or an attachment mounting portion or a take-out head including a posture control apparatus or a head mounting portion located at the distal end of the approach frame. It is only necessary that at least the die in the open state and components around the die should be imaged, and it is not necessary that the imaging device should be directed directly downward. In the present invention, the center of images from the imaging device, that is, the center of the imaging range, corresponds to the lateral position of the attachment mounting portion. That is, the center of the imaging range in the lateral direction always corresponds to the center of the attachment mounting portion in the lateral direction as the attachment mounting portion is moved in the lateral direction.

The teaching method also includes: causing the image display device to display an image such that a pair of reference symmetric structure portions (specifically a pair of guide pins, a pair of tie bars, a pair of outer edges of a fixed die, a pair of outer edges of a movable die, or a pair of outer edges of a platen) are included in the captured image displayed on the display section, the pair of reference symmetric structure portions being located symmetrically with respect to a second virtual plane which extends in the opening direction and the vertical direction and includes a virtual center line of the molding apparatus which extends in the opening direction; and using the teaching execution section to determine a lateral position of the approach frame in the take-out operation by changing the position of the approach frame such that the center of the imaging range is located at a middle position between the pair of reference symmetric structure portions included in the captured image.

To adjust the position of the attachment mounting portion in the lateral direction, the center of a suctioning portion of the take-out head, for example, is aligned with the "center of the molded product" such that the attachment mounting portion passes through a space between the tie bars and does not contact the die. The actual reference point is the center (nozzle center) of the die. However, the internal shape of the die varies widely and is complicated, and is difficult to be confirmed as the "reference point" and is occasionally hidden and not easily seeable from above, either through visual observation or image recognition with camera images. The middle position between the guide pins which support opening and closing of the die and the tie bars which support opening and closing of the molding apparatus is located at the same position as the nozzle center, that is, the center of the die. In addition, the center of the outer edges of the platen is also located at the same position as the center of the die. Thus, in the present invention, the center of the imaging range is located at the middle position between the pair of reference symmetric structure portions (a pair of guide pins, a pair of tie bars, a pair of outer edges of a fixed die, a pair of outer edges of a movable die, or a pair outer edges of a platen). The middle position refers to a position at which the distance between the pair of reference symmetric structure portions is bisected. With this configuration, the middle position becomes the reference point of the lateral position, and thus the lateral position of the approach frame during the take-out operation can be easily determined by changing the position of the approach frame.

In the method according to the present invention, the imaging device is disposed such that the center of the imaging range is located in the first virtual plane, which extends in both the opening direction in which the die is opened and closed and the vertical direction and which includes the center of the attachment mounting portion of the approach frame, and a pair of reference symmetric structure portions such as the pair of tie bars are visually recognized or detected to set the middle position between the pair of reference symmetric structure portions. The position of the attachment mounting portion in the lateral direction can be determined by aligning the center of the imaging range with the middle position between the pair of tie bars or the like. With the present invention, it is not necessary to calculate a distance from the imaging device, and a position in the lateral direction can be determined through alignment using an image and a screen.

The image display device may display, on a display screen of the display section, a center mark that indicates a center of the display screen; and the position of the approach frame may be changed such that the middle position and the center of the imaging range are located at a position of the center mark. Then, a position in the lateral direction can be determined through alignment using an image and a screen while viewing the display screen.

The image display device may display, on the display screen of the display section, indicators provided at constant intervals to extend in an X direction and a Y direction, which are orthogonal to each other, from the center of the display screen. With this configuration, there is no need to use an image recognition technique or for a technique in which a human teaches the presence of the tie bars etc. on a monitor.

The imaging device may be disposed on an existing apparatus for taking out molded product; and an existing controller or mobile communication terminal device may be used as the image display device. With this configuration, the method according to the present invention is also applicable to the existing apparatus for taking out molded product.

The imaging device may be provided to be removable, or such that a mounting position of the imaging device is changeable, or such that an attitude of the imaging device is changeable in a pull-out direction. With this configuration, it is not necessary that the imaging device should necessarily be directed directly downward unless the imaging device is shifted in the lateral direction. Thus, the imaging device can be removed or adjusted in position if the imaging device is in the way. After teaching is finished, the imaging device can be tilted at a stroke in the pull-out direction to be used to monitor the circumstance.

The present invention also provides a method including: disposing the imaging device so as to be able to capture the image of and around the die from a location above or obliquely above the die, and determining an arrangement position of the imaging device at a position offset from a virtual arrangement position at which a center of an imaging range is located in a first virtual plane, which extends in both an opening direction in which the die is opened and closed and a vertical direction and which includes a center of an attachment mounting portion of the approach frame, when a take-out operation is started; causing the image display device to display an image such that a pair of reference symmetric structure portions are included in the captured image displayed on the display section, the pair of reference symmetric structure portions being located symmetrically with respect to a second virtual plane which extends in the opening direction and the vertical direction and includes a virtual center line of the molding apparatus which extends in the opening direction; and causing the teaching execution section to change the position of the approach frame such that the center of the imaging range is located at a middle position between a pair of reference symmetric structure portions included in the captured image, subsequently to display, on the display section, a difference between a position of the center of the imaging range and a position of the center of the attachment mounting portion of the approach frame as an offset movement amount, and to subtract an amount of movement of the approach frame from the offset movement amount displayed on the display screen when determining a lateral position of the approach frame in the take-out operation by moving the approach frame by the offset movement amount.

With this configuration, the position of the approach frame in the lateral direction can be determined through alignment using an image and a screen, even if the imaging device is disposed at an offset position, by the operator moving the approach frame so as to decrease the offset movement amount displayed on the display section to zero.

The present invention further provides an apparatus for taking out molded product, including: a fixed frame; a movable frame that is movable along the fixed frame; an approach frame including an attachment such as a take-out head and movably held on the movable frame to go into a die of a molding apparatus; an operation control section configured to move the movable frame and the approach frame according to an operating sequence set in advance to take out the molded product from the die of the molding apparatus with the die being opened, and to carry the molded product to a predetermined position and release the molded product; an imaging device disposed to capture an image of and around the die; and an image display device disposed to display the captured image, which is captured by the imaging device, on a display section, in which the operation control section includes a teaching execution section configured to enable an operator to execute teaching of the operating sequence by changing a position of the approach frame while viewing the captured image displayed on the image display device. The imaging device is disposed to be able to capture an image of and around the die from a location above or obliquely above the die, and such that a center of an imaging range is located in a first virtual plane, which extends in both an opening direction in which the die is opened and closed and a vertical direction and which includes a center of an attachment mounting portion of the approach frame, when a take-out operation is started. The image display device is disposed to display an image such that a pair of reference symmetric structure portions are included in the captured image displayed on the display section, the pair of reference symmetric structure portions being located symmetrically with respect to a second virtual plane which extends in the opening direction and the vertical direction and includes a virtual center line of the molding apparatus which extends in the opening direction. The teaching execution section is configured to determine a lateral position of the approach frame in the take-out operation by changing the position of the approach frame such that the center of the imaging range is located at a middle position between the pair of reference symmetric structure portions included in the captured image. With the apparatus for taking out molded product according to the present invention, it is not necessary to calculate a distance from the imaging device, and a position in the lateral direction can be determined through alignment using an image and a screen.

The present invention is also applicable to an apparatus for taking out molded product, in which the imaging device is disposed to be able to capture an image of and around the die from a location above or obliquely above the die, and disposed at a position offset from a virtual arrangement position at which a center of an imaging range is located in a first virtual plane, which extends in both an opening direction in which the die is opened and closed and a vertical direction and which includes a center of an attachment mounting portion of the approach frame, when a take-out operation is started. In this case, the image display device is configured to display an image such that a pair of reference symmetric structure portions are included in the captured image displayed on the display section, the pair of reference symmetric structure portions being located symmetrically with respect to a second virtual plane which extends in the opening direction and the vertical direction and includes a virtual center line of the molding apparatus which extends in the opening direction. The teaching execution section is configured to change the position of the approach frame such that the center of the imaging range is located at a middle position between a pair of reference symmetric structure portions included in the captured image, subsequently to display, on the display section, a difference between a position of the center of the imaging range and a position of the center of the attachment mounting portion as an offset movement amount, and to subtract an amount of movement of the approach frame from the offset movement amount displayed on the display screen when determining a lateral position of the approach frame in the take-out operation by moving the approach frame by the offset movement amount. With this configuration, the position of the approach frame in the lateral direction can be determined through alignment using an image and a screen, even if the imaging device is disposed at an offset position.

DESCRIPTION OF EMBODIMENTS

A system for taking out molded product according to an embodiment of the present invention and a teaching method for the system will be described in detail below with reference to the drawings.

Figure 1:
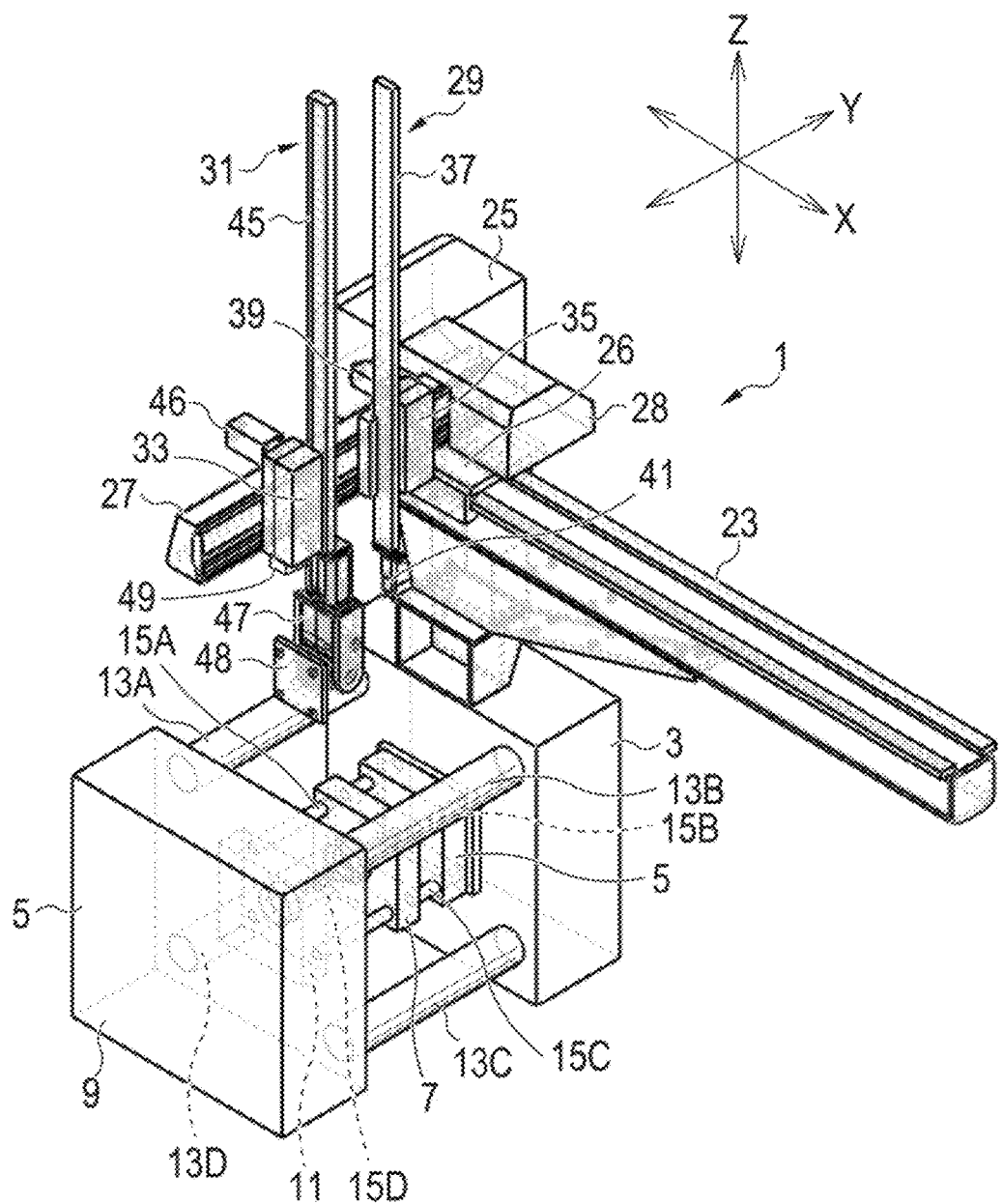
FIG. 1 is a perspective view illustrating a state in which an apparatus for taking out molded product according to an embodiment is mounted on a fixed platen of a molding apparatus.

FIG. 1 is a perspective view illustrating a state in which an apparatus 1 for taking out molded product according to an embodiment is mounted on a fixed platen 3 of a molding apparatus. In FIG. 1, a die plate portion of the molding apparatus is illustrated as being partially transparent. A fixed die 5 and an intermediate die 7 are fixed to the fixed platen 3 of the molding apparatus. A movable die 11 is fixed to a movable platen 9. Four tie bars 13A to 13D are disposed between the fixed platen 3 and the movable platen 9 to guide movement of the movable platen 9. The four tie bars 13A to 13D are disposed at equal intervals. A virtual center line CL (see FIG. 2) that passes through the center of the four tie bars 13A to 13D passes through the center (nozzle center) of the fixed die 5 and the movable die 11. The fixed die 5, the intermediate die 7, and the movable die 11 are guided by guide pins 15A to 15D. The four guide pins 15A to 15D are also disposed at equal intervals. A virtual center line CL (see FIG. 2) that passes through the center of the four guide pins 15A to 15D also passes through the center (nozzle center) of the fixed die 5 and the movable die 11.

The apparatus 1 includes a lateral frame 23, a control box 25, a pull-out frame 27, a runner elevating unit 29, and a molded product-suctioning elevating unit 31. The lateral frame 23 has a cantilever beam structure in which the lateral frame 23 extends in the X-axis direction which is horizontal and orthogonal to the longitudinal direction of the molding machine. The control box 25 is supported by the lateral frame 23. A travelling body 26 is advanced and retracted in the X-axis direction along the lateral frame 23 by a drive source formed by an AC servomotor (not illustrated) included in a servomechanism. The base portion of the pull-out frame 27, which is a movable frame, is mounted to the travelling body 26. The pull-out frame 27 extends in the Y-axis direction which is parallel to the longitudinal direction of the molding machine. The runner elevating unit 29 and the molded product-suctioning elevating unit 31 are supported by the pull-out frame 27 via travelling bodies 35 and 33 to be movable in the Y-axis direction by a drive source formed by an AC servomotor (not illustrated) included in a servomechanism. A control box 28 is mounted to the base portion of the pull-out frame 27.

The runner elevating unit 29 includes an elevating frame 37 provided on the travelling body 35, which is movably supported by the pull-out frame 27, to be elevated and lowered in the Z-axis direction. The travelling body 35 is movable in the Y-axis direction when the travelling body 35 is driven by the AC servomotor (not illustrated). The elevating frame 37 is elevated and lowered in the up-down direction (Z-axis direction) by an AC servomotor 39. The elevating frame 37 includes a chuck 41 that serves as an attachment for holding a runner to be wasted.

The travelling body 33 which is included in the molded product-suctioning elevating unit 31 is moved in the Y-axis direction on the pull-out frame 27 by the AC servomotor (not illustrated). The molded product-suctioning elevating unit 31 includes an elevating frame 45 that serves as an approach frame to be elevated and lowered in the up-down direction (Z-axis direction) by an AC servomotor 46, and a reverse unit 47 provided at the lower end of the elevating frame 45 to constitute a posture control apparatus. A take-out head 48 indicated by the broken line is mounted to the reverse unit 47. The pull-out frame 27 is moved in the transverse direction along the lateral frame 23 which extends in the transverse direction (X-axis direction). The elevating frames 37 and 45 which are moved in the front-rear direction (Y-axis direction), which is orthogonal to the up-down direction (Z-axis direction) and the transverse direction, are mounted to the pull-out frame 27 to be movable in the front-rear direction.

Figure 2:
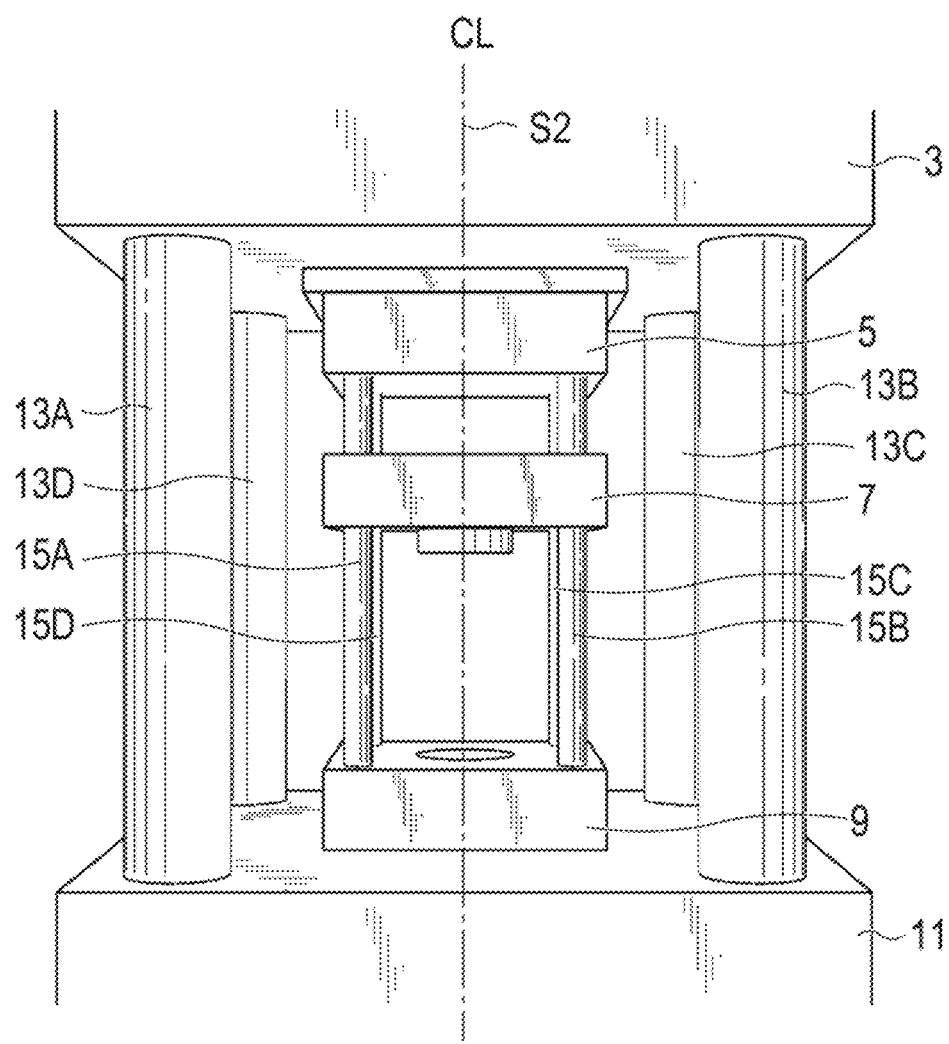
FIG. 2 illustrates an example of an image captured by an imaging device.
Figure 3:
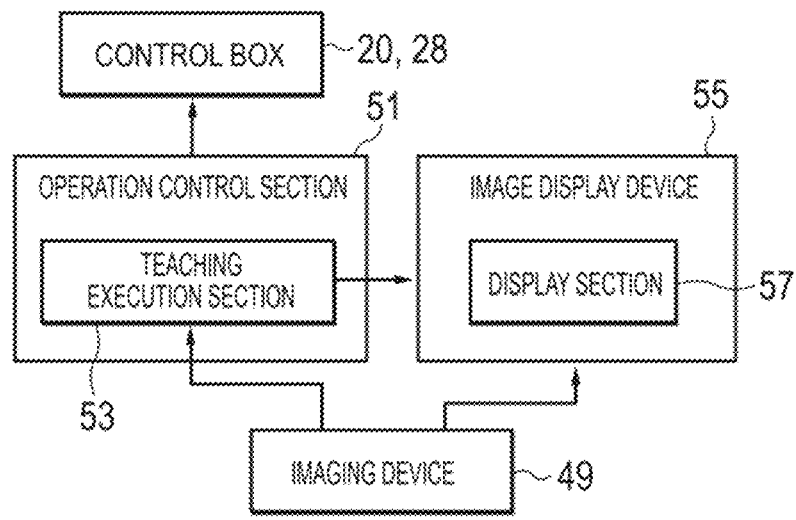
FIG. 3 is a block diagram illustrating the configuration of a control system of the apparatus for taking out molded product for use in the present embodiment.

In the present embodiment, an imaging device 49 as a camera for monitoring is installed on the lower surface of the travelling body 33. The imaging device 49 is installed at a position at which the imaging device 49 can capture images of and around the molding die (5, 7, 11) from a location above or obliquely above the die. FIG. 2 illustrates an example of an image captured by the imaging device 49. FIG. 3 is a block diagram illustrating the configuration of a control system of the apparatus for taking out molded product for use in the present embodiment. As illustrated in FIG. 3, the control system includes the imaging device 49, an operation control section 51, and an image display device 55 that includes a display section 57. The operation control section 51 transmits a control command to the control boxes 25 and 28 in accordance with an operating sequence. In addition, the operation control section 51 according to the present embodiment includes a teaching execution section 53 that enables teaching of the operating sequence by changing the position of the elevating frame 45, which constitutes the approach frame, while the operator is viewing the captured image displayed on the display section 57 of the image display device 55.

Figure 4:
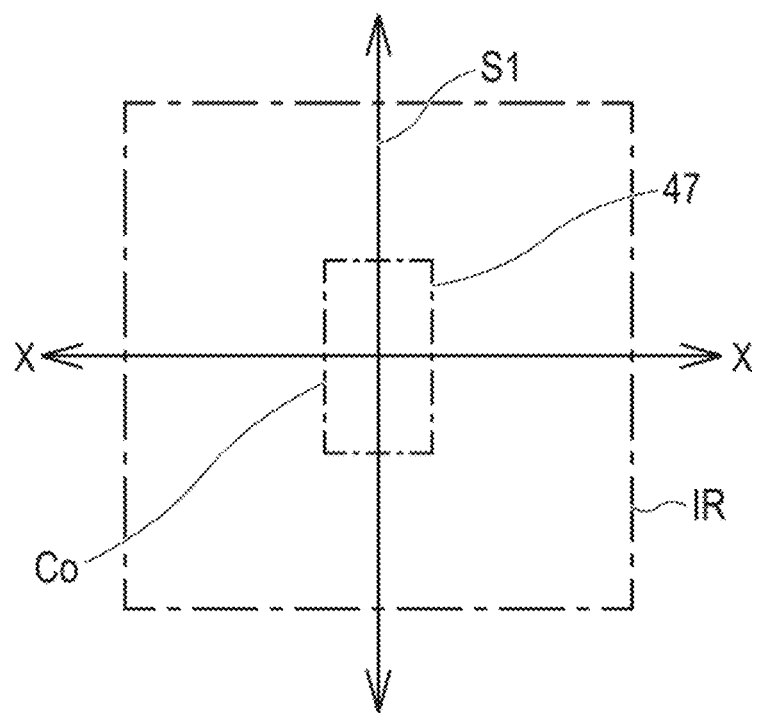
FIG. 4 illustrates the center of an imaging range.

In this example, the imaging device 49 captures images of and around the molding die (5, 7, 11) from a location directly above the die. As conceptually illustrated in FIG. 4, the imaging device 49 is mounted to the lower surface of the travelling body 33 such that a center Co of an imaging range IR is located in a first virtual plane S1 that includes the center of the reverse unit 47, which serves as an attachment mounting portion provided at the distal end of the elevating frame 45, and that extends in both an opening direction (Y direction) in which the die is opened and closed and the vertical direction (Z direction). The imaging device 49 can be attached to the elevating frame 45 which constitutes the approach frame itself, rather than the travelling body (movable base) 33 which moves the elevating frame 45 which constitutes the approach frame. It is only necessary that at least the die in the open state and components around the die should be in the imaging range IR, and it is not necessary that the imaging device 49 should be directed directly downward. In the present embodiment, the center of images from the imaging device 49, that is, the center Co of the imaging range IR, corresponds to the lateral position of the center of the reverse unit 47 (attachment mounting portion). That is, the center Co of the imaging range IR in the lateral direction is always reached by the center of the reverse unit 47 (attachment mounting portion) in the lateral direction as the reverse unit 47 is moved in the lateral direction.

Figure 5:
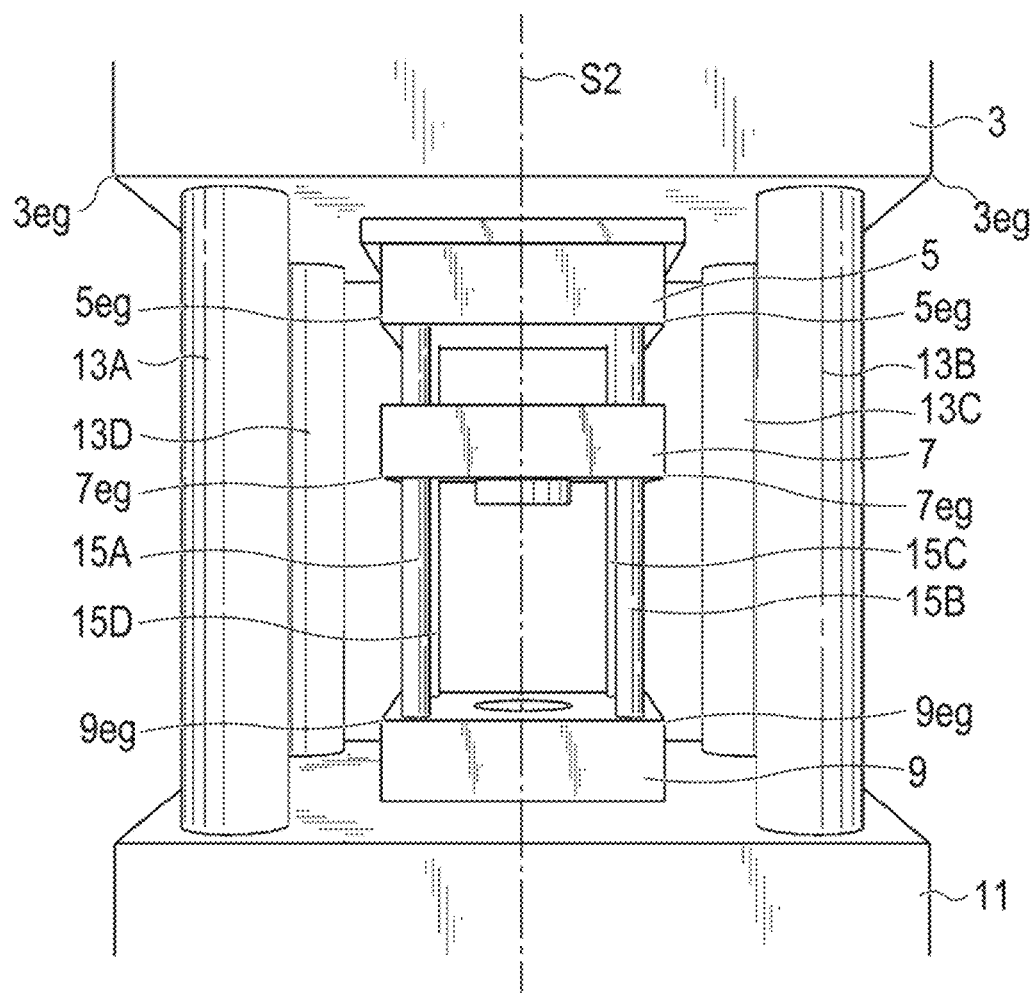
FIG. 5 illustrates a pair of symmetric structure portions.

In addition, the image display device 55 displays an image such that a captured image displayed on the display section 57 includes a pair of reference symmetric structure portions that are located symmetrically with respect to a second virtual plane S2 (see FIGS. 2 and 5) which extends in the opening direction and the vertical direction and includes a virtual center line CL of the molding apparatus which extends in the opening direction. Examples of the pair of reference symmetric structure portions include the pair of guide pins 15A and 15B, the pair of tie bars 13A and 13B, a pair of outer edges 5eg of the fixed die 5, a pair of outer edges (1eg, 11eg) of the movable die (7, 11), and a pair of outer edges 3eg of the platen 3. As illustrated in FIG. 3, the teaching execution section 53 is used to determine the lateral position of the elevating frame 45 (approach frame) in the take-out operation by changing the position of the elevating frame 45 (approach frame) such that the center Co of the imaging range IR is located at a middle position between the pair of reference symmetric structure portions included in the captured image.

To adjust the position of the reverse unit 47 (attachment mounting portion) in the lateral direction, the center of a suctioning portion of the take-out head 48, for example, is aligned with the "center of the molded product" such that the reverse unit 47 (attachment mounting portion) passes through a space between the tie bars 13A and 13B and does not contact the die 5, 7. The actual reference point is the center (nozzle center) of the die. However, the internal shape of the die varies widely and is complicated, and is difficult to be confirmed as the "reference point" and is occasionally hidden and not easily seeable from above, either through visual observation or image recognition with camera images. The middle position between the guide pins 15A and 15B which support opening and closing of the die and the tie bars 13A and 13B which support opening and closing of the molding apparatus is located at the same position as the nozzle center, that is, the center of the die. In addition, the center of the outer edges 3*eg* of the platen 3 is also located at the same position as the center of the die 5, 7, 11. Thus, in the present embodiment, the center of the imaging range is located at the middle position between the pair of reference symmetric structure portions. As illustrated in FIG. 2, the middle position refers to a position at which the distance between the pair of reference symmetric structure portions is bisected. With this configuration, the middle position corresponds to the reference point of the lateral position, and thus the lateral position of the approach frame during the take-out operation can be easily determined by changing the position of the elevating frame 45 (approach frame).

The imaging device 49 is disposed such that the center Co of the imaging range IR is located in the first virtual plane S1, which extends in both the opening direction (Y direction) in which the die is opened and closed and the vertical direction (Z direction) and which includes the center of the reverse unit 47 (attachment mounting portion) of the elevating frame 45, and a pair of reference symmetric structure portions such as the pair of tie bars 13A and 13B are visually recognized or detected to set the middle position between the pair of reference symmetric structure portions. The position of the reverse unit 47 (attachment mounting portion) in the lateral direction can be determined by aligning the center Co of the imaging range IR with the middle position between the pair of tie bars 13A and 13B or the like. With the present embodiment, it is not necessary to calculate a distance from the imaging device 49, and a position in the lateral direction (X direction) can be determined through alignment using an image and a screen.

Figure 6A:
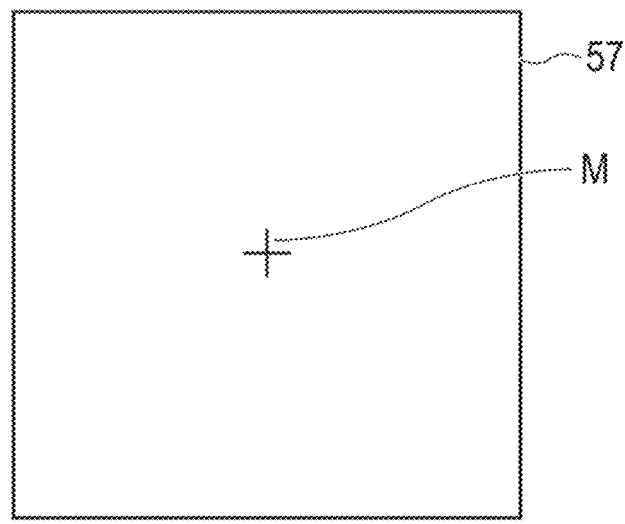
FIGS. 6A and 6B each illustrate an example of a display screen of a display section.

The position in the lateral direction (X direction) can be determined through alignment using an image and a screen while viewing the display screen of the display section 57, by the image display device 55 displaying a center mark M, which indicates the center of the display screen, on the display screen as illustrated in FIG. 6A and changing the position of the elevating frame 45 so as to align the middle position between the pair of tie bars 13A and 13B or the like with the position of the center mark M, that is, such that the center Co of the imaging range IR is located at the center mark M.

Figure 6B:
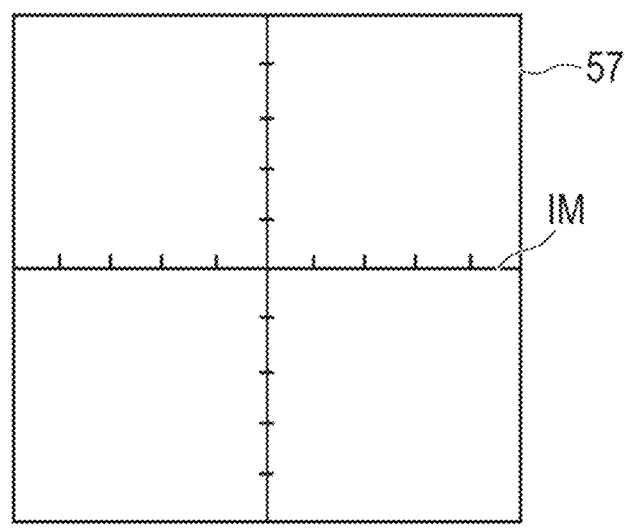

The image display device 55 may display, on the display screen of the display section 57, indicators IM provided at constant intervals to extend in the X direction and the Y direction, which are orthogonal to each other, from the center of the display screen as illustrated in FIG. 6B. With this configuration, there is no need to use an image recognition technique or for a technique in which a human teaches the position at which the tie bars or the like are present on a monitor. By using such indicators, alignment in the pull-out direction can be made while viewing an image on the display section 57.

Alignment in the pull-out direction (Y direction) and alignment in the up-down direction (Z direction) can be made by the operator standing on the floor surface on which the molding apparatus is placed and viewing the position of the take-out head 48 in the space between the dies. This positioning work is performed in teaching work according to the conventional art. With the method according to the present invention, it is possible to accurately perform positioning in the lateral direction (X direction), which cannot be accurately performed according to the conventional art.

The imaging device 49 may be disposed on an existing apparatus for taking out molded product, and an existing controller or mobile communication terminal device may be used as the image display device. With this configuration, the method according to the present invention is also applicable to the existing apparatus for taking out molded product.

The imaging device may be provided to be removable, or such that a mounting position of the imaging device is changeable, or such that an attitude of the imaging device is changeable in a pull-out direction. With this configuration, it is not necessary that the imaging device should necessarily be directed directly downward unless the imaging device is shifted in the lateral direction. Thus, the imaging device can be removed or adjusted in position if the imaging device is in the way. When teaching is finished, the imaging device can be tilted at a stroke in the pull-out direction to be used to monitor the circumstance.

Modification

The method according to the present invention is also applicable to a case where the imaging device 49 is disposed so as to be able to capture images of and around the die (5, 7, 11) from a location above or obliquely above the die, and such that the center Co of the imaging range IR is shifted (offset) by a predetermined amount in the lateral direction (X direction), which is orthogonal to both the opening direction (Y direction) in which the die is opened and closed and the vertical direction (Z direction), from the first virtual plane S1, which extends in both the opening direction and the vertical direction and which includes the center of the reverse unit 47 (attachment mounting portion) of the elevating frame 45 (approach frame), when a take-out operation is started.

Figure 7:
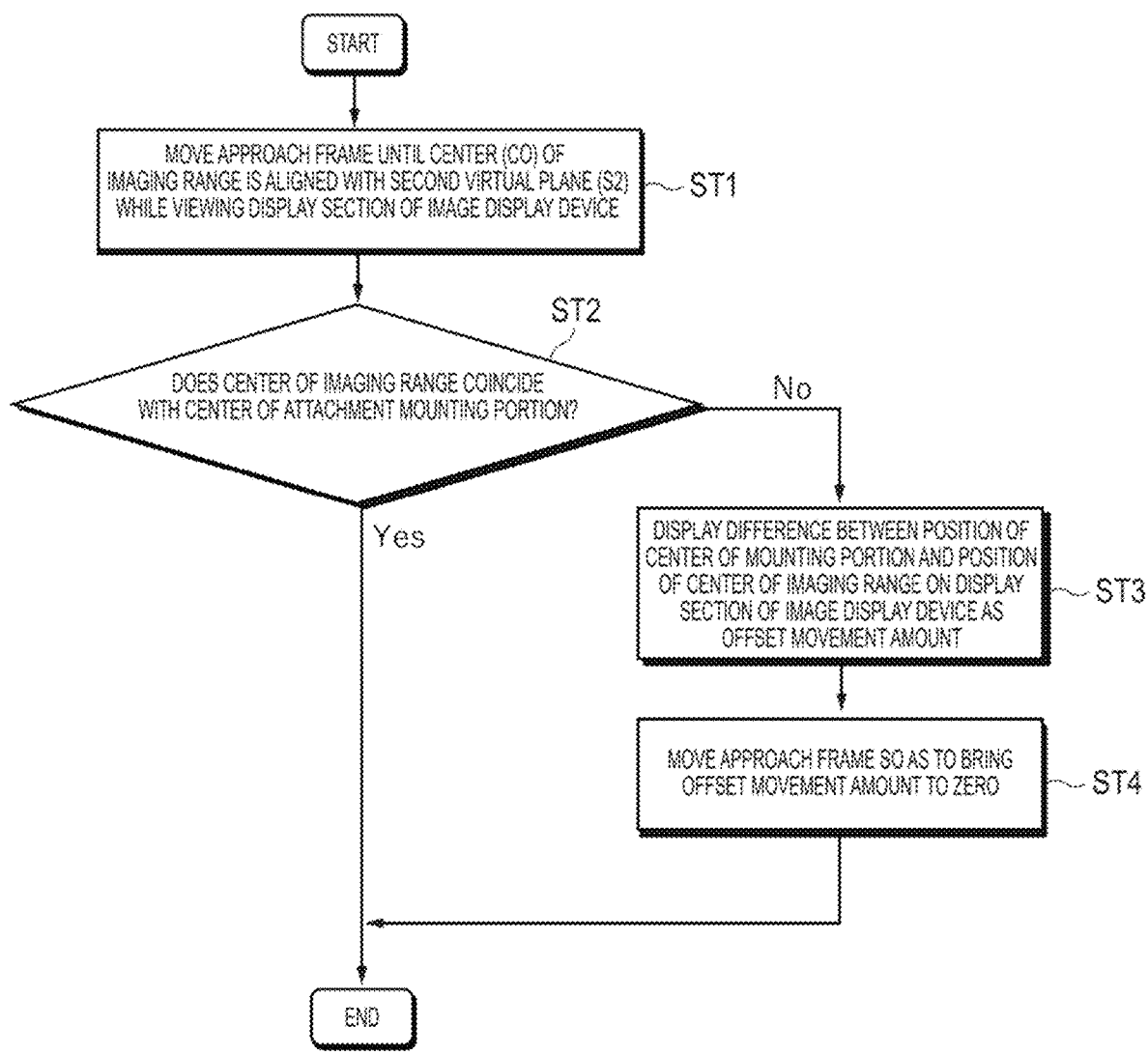
FIG. 7 is a flowchart for a case where the method according to the present invention is applied to a case where the imaging device is offset.
Figure 8:
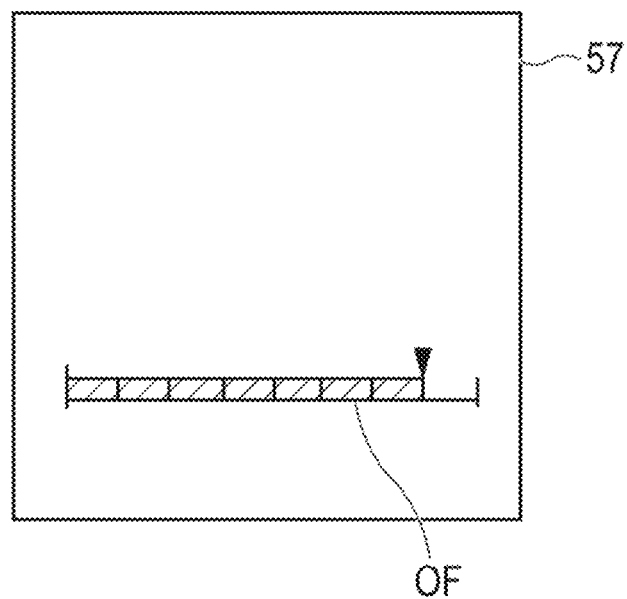
FIG. 8 is a schematic view of an image illustrating an example for a case where an offset movement amount is indicated on the display section.

FIG. 7 is a flowchart illustrating a part of an algorithm of a computer program that is used by the teaching execution section 53 to implement the method according to the present invention in such a case. FIG. 8 is a schematic view of an image illustrating an example for a case where an offset movement amount OF is indicated on the display section 57. The image display device 55 displays an image such that an imaging range IR displayed on the display section 57 includes a pair of reference symmetric structure portions that are located symmetrically with respect to a second virtual plane (S2) which extends in the opening direction and the vertical direction and includes a virtual center line of the molding apparatus which extends in the opening direction. Examples of the pair of reference symmetric structure portions include the pair of guide pins 15A and 15B, the pair of tie bars 13A and 13B, a pair of outer edges 5*eg* of the fixed die 5, a pair of outer edges (1*eg*, 11*eg*) of the movable die (7, 11), and a pair of outer edges 3*eg* of the platen 3. The teaching execution section 53 changes the position of the elevating frame 45 (approach frame) such that the center Co of the imaging range IR is located at the middle position between the pair of reference symmetric structure portions included in the imaging range (until the center Co of the imaging range IR matches the second virtual plane S2) (step ST1). Subsequently, the process proceeds to step ST3 if there is a difference between the position of the center Co of the imaging range IR and the position of the center of the attachment mounting portion (reverse unit 47), and the process is ended if there is no such difference (step ST2). If there is a difference between the position of the center Co of the imaging range IR and the center of the attachment mounting portion (reverse unit 47), the difference is displayed on the display section 57 as an offset movement amount OF (step ST3). While it is revealed in the design stage whether or not there is any such difference, it can also be calculated using a known diagnostic imaging technique. The lateral position of the elevating frame 45 (approach frame) in the take-out operation is determined by moving the elevating frame 45 (approach frame) by the offset movement amount OF (step ST4). In this event, the amount of movement of the elevating frame 45 (approach frame) is subtracted from the displayed offset movement amount OF. The position of the elevating frame 45 (approach frame) in the lateral direction can be determined through alignment using an image and a screen, even if the imaging device 49 is disposed at an offset position, by the operator moving the elevating frame 45 (approach frame) so as to decrease the offset movement amount OF displayed on the display section 57 to zero (step ST4).

INDUSTRIAL APPLICABILITY

With the method according to the present invention, it is possible to determine the position of the attachment mounting portion in the lateral direction, by disposing the imaging device such that the center of the imaging range is located in the first virtual plane, which extends in both the opening direction in which the die is opened and closed and the vertical direction and which includes the center of the attachment mounting portion of the approach frame, visually recognizing or detecting a pair of reference symmetric structure portions such as a pair of tie bars to set the middle position between the pair of reference symmetric structure portions, and aligning the center of the imaging range with the middle position between the pair of tie bars or the like. Thus, with the present invention, it is not necessary to calculate a distance from the imaging device, and a position in the lateral direction can be determined through alignment using an image and a screen of the display section.

While the preferred embodiments of the invention have been described with a certain degree of particularity with reference to the drawings, obvious modifications and variations are possible in light of the above teachings. It is therefore to be understood that within the scope of the appended claims, the invention may be practiced other than as specifically described.

What is claimed is:

1. A teaching method for a system for taking out molded product, the system comprising:
   a fixed frame;
   a movable frame that is movable along the fixed frame;
   an approach frame including an attachment such as a take-out head and movably held on the movable frame to go into a die of a molding apparatus;
   an operation control section configured to move the movable frame and the approach frame according to an operating sequence set in advance to take out the molded product from the die of the molding apparatus with the die being opened, and to carry the molded product to a predetermined position and release the molded product;
   an imaging device disposed to capture an image of and around the die; and
   an image display device configured to display the captured image, which is captured by the imaging device, on a display section,
   the operation control section including a teaching execution section configured to enable an operator to execute teaching of the operating sequence by changing a position of the approach frame while viewing the captured image displayed on the image display device,
   the teaching method comprising:
   disposing the imaging device so as to be able to capture the image of and around the die from a location above or obliquely above the die, and such that a center of an imaging range is located in a first virtual plane, which extends in both an opening direction in which the die is opened and closed and a vertical direction and which includes a center of an attachment mounting portion of the approach frame, when a take-out operation is started;
   causing the image display device to display an image such that a pair of reference symmetric structure portions are included in the captured image displayed on the display section, the pair of reference symmetric structure portions being located symmetrically with respect to a second virtual plane which extends in the opening direction and the vertical direction and includes a virtual center line of the molding apparatus which extends in the opening direction; and
   using the teaching execution section to determine a lateral position of the approach frame in the take-out operation by changing the position of the approach frame such that the center of the imaging range is located at a middle position between the pair of reference symmetric structure portions included in the captured image.

2. The teaching method for a system for taking out molded product according to claim 1, wherein
   the pair of reference symmetric structure portions are a pair of guide pins, a pair of tie bars, a pair of outer edges of a fixed die, a pair of outer edges of a movable die, or a pair of outer edges of a platen.

3. The teaching method for a system for taking out molded product according to claim 1, wherein:
   the image display device displays, on a display screen of the display section, a center mark that indicates a center of the display screen; and
   the position of the approach frame is changed such that the middle position and the center of the imaging range are located at a position of the center mark.

4. The teaching method for a system for taking out molded product according to claim 3, wherein
   the image display device displays, on the display screen of the display section, indicators provided at constant intervals to extend in an X direction and a Y direction, which are orthogonal to each other, from the center of the display screen.

5. The teaching method for a system for taking out molded product according to claim 1, wherein:
   the imaging device is disposed on an existing apparatus for taking out molded product; and
   an existing controller or mobile communication terminal device is used as the image display device.

6. The teaching method for a system for taking out molded product according to claim 1, wherein
   the imaging device is provided to be removable, or such that a mounting position of the imaging device is changeable, or such that an attitude of the imaging device is changeable in a pull-out direction.

7. A teaching method for a system for taking out molded product, the system comprising:
   a fixed frame;
   a movable frame that is movable along the fixed frame;
   an approach frame including an attachment such as a take-out head and movably held on the movable frame to go into a die of a molding apparatus;
   an operation control section configured to move the movable frame and the approach frame according to an operating sequence set in advance to take out the molded product from the die of the molding apparatus with the die being opened, and to carry the molded product to a predetermined position and release the molded product;
an imaging device disposed to capture an image of and around the die; and
an image display device configured to display the captured image, which is captured by the imaging device, on a display section,
the operation control section including a teaching execution section configured to enable an operator to execute teaching of the operating sequence by changing a position of the approach frame while viewing the captured image displayed on the image display device,
the teaching method comprising:
disposing the imaging device so as to be able to capture the image of and around the die from a location above or obliquely above the die, and determining an arrangement position of the imaging device at a position offset from a virtual arrangement position at which a center of an imaging range is located in a first virtual plane, which extends in both an opening direction in which the die is opened and closed and a vertical direction and which includes a center of an attachment mounting portion of the approach frame, when a take-out operation is started;
causing the image display device to display an image such that a pair of reference symmetric structure portions are included in the captured image displayed on the display section, the pair of reference symmetric structure portions being located symmetrically with respect to a second virtual plane which extends in the opening direction and the vertical direction and includes a virtual center line of the molding apparatus which extends in the opening direction; and
causing the teaching execution section to change the position of the approach frame such that the center of the imaging range is located at a middle position between a pair of reference symmetric structure portions included in the captured image, subsequently to display, on the display section, a difference between a position of the center of the imaging range and a position of the center of the attachment mounting portion of the approach frame as an offset movement amount, and to subtract an amount of movement of the approach frame from the offset movement amount displayed on the display screen when determining a lateral position of the approach frame in the take-out operation by moving the approach frame by the offset movement amount.

8. The teaching method for a system for taking out molded product according to claim 7, wherein
the pair of reference symmetric structure portions are at least a pair of guide pins, a pair of tie bars, a pair of outer edges of a fixed die, a pair of outer edges of a movable die, or a pair of outer edges of a platen.

9. An apparatus for taking out molded product, comprising:
a fixed frame;
a movable frame that is movable along the fixed frame;
an approach frame including an attachment such as a take-out head and movably held on the movable frame to go into a die of a molding apparatus;
an operation control section configured to move the movable frame and the approach frame according to an operating sequence set in advance to take out the molded product from the die of the molding apparatus with the die being opened, and to carry the molded product to a predetermined position and release the molded product;
an imaging device disposed to capture an image of and around the die; and
an image display device disposed to display the captured image, which is captured by the imaging device, on a display section, wherein:
the operation control section includes a teaching execution section configured to enable an operator to execute teaching of the operating sequence by changing a position of the approach frame while viewing the captured image displayed on the image display device;
the imaging device is disposed to be able to capture an image of and around the die from a location above or obliquely above the die, and such that a center of an imaging range is located in a first virtual plane, which extends in both an opening direction in which the die is opened and closed and a vertical direction and which includes a center of an attachment mounting portion of the approach frame, when a take-out operation is started;
the image display device is disposed to display an image such that a pair of reference symmetric structure portions are included in the captured image displayed on the display section, the pair of reference symmetric structure portions being located symmetrically with respect to a second virtual plane which extends in the opening direction and the vertical direction and includes a virtual center line of the molding apparatus which extends in the opening direction; and
the teaching execution section is configured to determine a lateral position of the approach frame in the take-out operation by changing the position of the approach frame such that the center of the imaging range is located at a middle position between the pair of reference symmetric structure portions included in the captured image.

10. An apparatus for taking out molded product, comprising:
a fixed frame;
a movable frame that is movable along the fixed frame;
an approach frame including an attachment such as a take-out head and movably held on the movable frame to go into a die of a molding apparatus;
an operation control section configured to move the movable frame and the approach frame according to an operating sequence set in advance to take out a molded product from the die of the molding apparatus with the die being opened, and to carry the molded product to a predetermined position and release the molded product;
an imaging device disposed to capture an image of and around the die; and
an image display device configured to display the captured image, which is captured by the imaging device, on a display section,
the operation control section including a teaching execution section configured to enable an operator to execute teaching of the operating sequence by changing a position of the approach frame while viewing the captured image displayed on the image display device, wherein:
the imaging device is disposed to be able to capture an image of and around the die from a location above or obliquely above the die, and disposed at a position offset from a virtual arrangement position at which a center of an imaging range is located in a first virtual plane, which extends in both an opening direction in which the die is opened and closed and a vertical direction and which includes a center of an attachment mounting portion of the approach frame, when a take-out operation is started;

the image display device is configured to display an image such that a pair of reference symmetric structure portions are included in the captured image displayed on the display section, the pair of reference symmetric structure portions being located symmetrically with respect to a second virtual plane which extends in the opening direction and the vertical direction and includes a virtual center line of the molding apparatus which extends in the opening direction; and the teaching execution section is configured to change the position of the approach frame such that the center of the imaging range is located at a middle position between a pair of reference symmetric structure portions included in the captured image, subsequently to display, on the display section, a difference between a position of the center of the imaging range and a position of the center of the attachment mounting portion as an offset movement amount, and to subtract an amount of movement of the approach frame from the offset movement amount displayed on the display screen when determining a lateral position of the approach frame in the take-out operation by moving the approach frame by the offset movement amount.

11. The apparatus for taking out molded product according to claim 10, wherein the pair of reference symmetric structure portions are at least a pair of guide pins, a pair of tie bars, a pair of outer edges of a fixed die, a pair of outer edges of a movable die, or a pair of outer edges of a platen.

* * * * *